(12) United States Patent
Sheha et al.

(10) Patent No.: US 7,486,958 B2
(45) Date of Patent: Feb. 3, 2009

(54) SYSTEM AND METHOD FOR MAINTAINING AN ONLINE POINT-OF-INTEREST DIRECTORY

(75) Inventors: Michael A. Sheha, Laguna Niguel, CA (US); Angie Sheha, Laguna Niguel, CA (US); Stephen Petilli, Laguna Niguel, CA (US)

(73) Assignee: Networks In Motion, Inc., Aliso Viejo, CA (US)

( * ) Notice: Subject to any disclaimer, the term of this patent is extended or adjusted under 35 U.S.C. 154(b) by 35 days.

(21) Appl. No.: 10/235,963

(22) Filed: Sep. 4, 2002

(65) Prior Publication Data

US 2003/0078035 A1 Apr. 24, 2003

Related U.S. Application Data

(60) Provisional application No. 60/317,519, filed on Sep. 5, 2001.

(51) Int. Cl.
*H04Q 7/20* (2006.01)
(52) U.S. Cl. .............. 455/456.3; 379/93.23; 379/142.1; 379/207.12; 707/3; 707/4
(58) Field of Classification Search .................. 455/403, 455/414.1, 456.5, 456.1, 456.3, 457; 342/357.13; 707/3–6, 104.1; 379/201.03, 215.01, 93.23, 379/142.05, 142.1, 207.12; 709/223; 705/44
See application file for complete search history.

(56) References Cited

U.S. PATENT DOCUMENTS

| | | | |
|---|---|---|---|
| 4,939,662 A | 7/1990 | Nimura et al. | |
| 5,561,704 A * | 10/1996 | Salimando | 455/456.5 |
| 5,727,057 A | 3/1998 | Emery | |
| 5,802,492 A | 9/1998 | DeLorme et al. | |
| 5,904,727 A | 5/1999 | Prabhakaran | |
| 6,049,718 A | 4/2000 | Stewart | |
| 6,084,951 A | 7/2000 | Smith | |
| 6,091,957 A | 7/2000 | Larkins et al. | |
| 6,185,426 B1 | 2/2001 | Alperovich et al. | |
| 6,208,934 B1 | 3/2001 | Bechtolsheim et al. | |
| 6,226,367 B1 | 5/2001 | Smith | |
| 6,353,664 B1 | 3/2002 | Cannon | |
| 6,377,210 B1 | 4/2002 | Moore | |
| 6,459,782 B1 | 10/2002 | Bedrosian | |
| 6,539,080 B1 | 3/2003 | Bruce | |
| 6,643,516 B1 | 11/2003 | Stewart | |
| 6,674,849 B1 | 1/2004 | Froeberg | |
| 6,766,174 B1 | 7/2004 | Kenyon | |

(Continued)

FOREIGN PATENT DOCUMENTS

GB 2305568 4/1997

(Continued)

*Primary Examiner*—Md S Elahee
(74) *Attorney, Agent, or Firm*—Morrison & Foerster LLP

(57) ABSTRACT

The present invention is directed to a system and method for collecting and maintaining an up-to-date database of points of interests, whereby agents of the points of interests, such as owners or operators of hotels or restaurants, can register their point of interest onto the database by uploading their contact information and physical address. Subsequently, on a periodic basis, the agents of the points of interests may log into the system and update their information, such as operating hours. The collected data is then made accessible to the general public and can be searched through using a variety of search criteria.

23 Claims, 12 Drawing Sheets

U.S. PATENT DOCUMENTS

| | | |
|---|---|---|
| 6,775,371 B2 | 8/2004 | Elsey |
| 6,788,774 B1 * | 9/2004 | Caldwell et al. ........ 379/201.03 |
| 6,813,347 B2 * | 11/2004 | Baals et al. ............ 379/215.01 |
| 7,124,112 B1 * | 10/2006 | Guyan et al. ................... 705/44 |
| 2001/0027472 A1 * | 10/2001 | Guan ......................... 709/203 |
| 2002/0052786 A1 | 5/2002 | Kim et al. |
| 2002/0059201 A1 * | 5/2002 | Work ............................ 707/3 |
| 2002/0107776 A1 * | 8/2002 | Bove et al. .................... 705/37 |
| 2003/0061211 A1 | 3/2003 | Shultz et al. |
| 2004/0088355 A1 * | 5/2004 | Hagan et al. ................. 709/203 |
| 2004/0229595 A1 * | 11/2004 | Laursen et al. .............. 455/403 |

FOREIGN PATENT DOCUMENTS

| | | |
|---|---|---|
| WO | WO 96/36930 | 11/1996 |

* cited by examiner

1). Name
2). Street Address
3). City
4). State
5). Zip Code
6). Telephone Number

*Typical Telephone Book Fields*

← 100

XYZ Technologies
175 S Lake Ave #7
Pasadena, CA 91106-4707
Phone: (626) 555-1541

*Telephone Book Entry Example*

| | | |
|---|---|---|
| FIG 7.1 | CONTACT NAME |
| FIG 7.2. | COMPANY URL ADDRESS |
| FIG 7.3. | COMPANY EMAIL ADDRESS |
| FIG 7.4. | COMPANY NAME |
| FIG 7.5. | ADDRESS |
| FIG 7.6. | CITY |
| FIG 7.7. | STATE |
| FIG 7.8. | 5 DIGIT ZIP CODE |
| FIG 7.9. | 4 DIGIT ZIP CODE |
| FIG 7.10. | CARRIER ROUTE CODE |
| FIG 7.11. | STATE CODE |
| FIG 7.12. | COUNTY CODE |
| FIG 7.13. | PHONE |
| FIG 7.14. | CLASSIFICATION CODE |
| FIG 7.15. | FRANCHISE CODE |
| FIG 7.16. | AD SIZE CODE |
| FIG 7.17. | CREDIT CARD |
| FIG 7.18. | POPULATION CODE |
| FIG 7.19. | INDIVIDUAL OR FIRM |
| FIG 7.20. | YEAR |
| FIG 7.21. | LAST NAME |
| FIG 7.22. | FIRST NAME |
| FIG 7.23. | CONTACT PROF TITLE |
| FIG 7.24. | CONTACT TITLECODE |
| FIG 7.25. | CONTACT GENDER |
| FIG 7.26. | EMPLOYEE SIZE |
| FIG 7.27. | SALES VOLUME/ASSET SIZE CODE |
| FIG 7.28. | INDUSTRY SPECIFIC CODE |
| FIG 7.29. | HQ/BRANCH CODE |
| FIG 7.30. | KEY CODE |
| FIG 7.31. | FAX NUMBER (AREA CODE & FAX #) |
| FIG 7.32. | OFFICE SIZE |
| FIG 7.33. | CURRENT DATE (MMDDYYYY) |
| FIG 7.34. | LOCATION NUMBER |
| FIG 7.35. | SUBSIDIARY NUMBER |
| FIG 7.36. | PARENT NUMBER |
| FIG 7.37. | PRIMARY CLASSIFICATION CODE |
| FIG 7.38. | LATITUDE |
| FIG 7.39. | LONGITUDE |
| FIG 7.40. | ALTITUDE |
| FIG 7.41. | MATCH LEVEL |
| FIG 7.42. | CENSUS TRACT |
| FIG 7.43. | CENSUS BLOCK GROUP |

*FIG. 7*

Welcome (POI User Name)

POI URL [http://]

Company Na|
CONTACT NAME
COMPANY URL ADDRESS
Company Ad| COMPANY EMAIL ADDRESS
COMPANY NAME
ADDRESS
Company Co| CITY
STATE
5 DIGIT ZIP CODE
ZIP + 4
CARRIER ROUTE CODE
STATE CODE
COUNTY CODE
PHONE
YEAR
LAST NAME
FIRST NAME
CREATE YOUR OWN FIELD 800
801
802
803

FIG. 8A

CONTACT NAME
COMPANY URL ADDRESS
COMPANY EMAIL ADDRESS
COMPANY NAME
ADDRESS
CITY
STATE
5 DIGIT ZIP CODE
ZIP + 4
CARRIER ROUTE CODE
STATE CODE
COUNTY CODE
PHONE
YEAR
LAST NAME
FIRST NAME
EMPLOYEE SIZE 804
805

SYSTEM AND METHOD FOR MAINTAINING AN ONLINE POINT-OF-INTEREST DIRECTORY

CROSS-REFERENCE TO RELATED APPLICATIONS

Embodiments of the present invention claim priority from U.S. provisional patent application Ser. No. 60/317,519 filed Sep. 5, 2001.

BACKGROUND

1. Field of Invention

This invention relates to a method and system for securely identifying an authorized user for the purposes of updating Point of Interest (POI) field and record information and associating position information to both wired and wireless IP addresses.

2. Description of the Related Art

Currently, POI information is available to people by means of telephone books, both hardcopies and online web versions, and typically represents business and individual information, such as telephone number, street address, city, state, zip code, amongst other categories specific to various POIs. Governing communication organizations, such as telephone companies, typically collect, update, and slowly disseminate this information to a wide variety of people for various applications. Additionally, other organizations collect telephone books from various telephone companies and compile this information in an all encompassing master list of various POIs, such as in the white pages, which consists of listings of individuals and businesses, such as restaurants, golf courses facilities, movie theaters, etc. Current POI collection primarily involves a 'rake' collection method, where information is initially documented from various organizations, typically from an organization where a telephone line is installed, and then gathered, or 'raked' together from these initial databases.

This method of collecting information about individuals and POIs is not very reliable, since updated telephone books, for example, are typically released only once a year. Currently, individuals can update their information at a local database, such as a telephone book, by calling their respective telephone company and updating their information. This update will not be visible in their telephone book typically for at most a year. An online Internet search system, such as Switchboard.com or Smartpages.com, allows individuals to update their listed information by registering at the search system's website, by providing their e-mail address, entering the updated information, and acknowledging that they are either (a) the person whose listing they wish to modify or (b) an authorized agent of the person whose listing they wish to modify. An e-mail is sent to the e-mail address supplied by the individual that requested the update, and once the individual replies to the e-mail or clicks on a URL in the body of the e-mail, the specified listing information is updated in the online directory server's database. This method does not check the requesting individual's authenticity or authorization over the individual whose information is being updated. With the advent of free anonymous e-mail addresses, any individual can spoof this method and system to fraudulently steal or change another person's identity.

For instance, an individual that updates this system could be a person of deception or moral turpitude who may want to steal another person's identity. This deceptive person, using an anonymous e-mail address, such as provided by Hotmail.com, could update an unsuspecting person's telephone number information on an online directory. When other people see the unsuspecting, innocent person's name on the online directory, they may then be re-directed to the telephone number or other information, such as the mailing address, that may have been changed by the deceptive person. Currently, this updating or removal process is only available for individual persons, not businesses, and provides no guarantee that individuals requesting changes are actually who they seem to represent.

Additionally, businesses change their names, addresses, telephone numbers, etc., as a business grows, through a merger or acquisition, or for any of a multitude of other reasons. Various POI category data associated with businesses is used for various purposes, such as customers wanting to locate a particular business based on their current location and hours of operation.

It is important for businesses to keep their listing information as accurate as possible and to have this update be reflected as quickly as possible in a customer-accessible database, so as to drive more potential customers to the business. Current, prior art systems, such as that provided by InfoUSA.com, allows business listings to be updated through a lengthy process, which can typically take between 30 to 60 days. This process typically begins with an authorized business person logging-on to the InfoUSA.com website and updating the POI information by providing required fields, such as the business name, telephone number, address, city, state, and zip code. An InfoUSA.com authorized representative then contacts the business, after the typical 30 to 60 day period, to verify and update the information. This prevents a business from quickly updating its critical POI information for consumers to utilize, thus reducing the amount of potential business that the information update could have enabled, such as when a business changes its telephone number or address.

Additionally, as more mobile devices become available, the need for providing routes or driving directions from the device's current location to a desired POI destination, such as a restaurant, is becoming commonplace. Thus, POIs, such as businesses, will want to differentiate themselves from their competitors as much as possible by providing potential customers with additional information about them, such as URLs or web addresses.

Current prior art POI databases, such as telephone books or online telephone directories, do not enable businesses to securely or quickly update various POI information, such as their web address. The use of mobile devices, such as network-enabled wireless cellular telephones, will allow consumers to search for nearby POIs, such as restaurants. Consumers may then want to conveniently view an online menu from their restaurant POI search. This requires POI data to incorporate not just contact information, such as telephone number and address, but other information associated with their business, such as a web address or URLs. Since the Internet is so dynamic, businesses may change web addresses periodically, such as in the case of a small business owner using a free online web-hosting site that may periodically change the web address.

Business web addresses (i.e., URL's) would typically change more frequently than other business POI fields, such as a business name or telephone number. As another example of requiring various POIs to update or change their web address periodically, when a franchise or chain has a single top-level domain representing the entire franchise or chain, there may be various internal websites for individual POI storefronts of the franchise or chain. It is essential, and currently not possible, for individual POIs of the franchise or chain to be able to quickly and easily update their POI information, such as their particular web address or URL, in order to enable consumers to access as much information about the business as possible in order to attract increased business.

The growth and design of the Internet has caused millions upon billions of needed Internet Protocol (IP) addresses to be allocated. The current internetworking protocol, under the IPv4 format, allows for a potential of 232 (over 4.29 billion) possible mutually exclusive IP address combinations. The new internet working protocol, IPv6, provides a potential of 2128 (over 3.4*1029 billion) possible mutually exclusive IP address combinations. A problem exists in that there is no current accurate method that enables the controlling users of IP addresses to map their IP address information to position information (e.g., latitude and longitude).

American Registry for Internet Numbers (ARIN) is a non-profit organization established for the purpose of administration and registration of IP numbers for the following geographical areas: 1). North America, 2). South America, 3). Caribbean, and 4). sub-Saharan Africa. ARIN is one of three Regional Internet Registries (RIRs) worldwide which collectively provide IP registration services to all regions around the globe. The others are: 1). Reseaux Internet Protocol Europeens (RIPE NCC)-(regions include Europe, Middle East, and parts of Africa), and 2). Asia Pacific Network. Information Center (APNIC)-(regions include Asia Pacific).

ARIN was established to allocate or assign Internet Protocol (IP) address space to Internet Service Providers (ISPs) and to end-users. A distinction is made between address allocation and address assignment, i.e., ISPs are "allocated" address space, while end users are "assigned" address space. ISPs are allocated blocks of IP addresses for the purpose of assigning that space to their customers, while end users receive assignments of IP addresses exclusively for use in their own operational networks. IP addresses are distributed in a tree distribution architecture, where one organization provides a large block of IP addresses to an organization beneath it, which provides IP addresses to users or organizations beneath it, and this process continues until end-users (or IP address end-nodes) have been assigned IP addresses for their use. The minimum block of IP address space assigned by ARIN is 4,096. All organizations that require allocations of fewer than 4,096 IP addresses must request the address space from their upstream IP address provider, such as an ISP.

When IP addresses are allocated to organizations (i.e., ARIN, ISPs, etc.), a record is stored of each 'owner' of the block of IP addresses, which can typically be viewed and accessed through a WHOIS database search. One example that illustrates how a typical block of allocated IP addresses is recorded in a publicly-accessible WHOIS database, is shown in Table 1. Given that a Digital Subscriber Line (DSL) business user, who has a static IP address number 168.103.86.33, is located at 515 S. Madison Avenue Suite 738 in Pasadena, Calif., Table 1 shows the results of a WHOIS database search for the IP address 168.103.86.33.

TABLE 1

Output from ARIN WHOIS Search

WHOIS Search Query for IP Address 168.103.86.33
US WEST Communications Services (NET-OMAHAIVDS)
    600 Stinson Blvd
    Minneapolis, MN 55413
    US
    Netname: OMAHAIVDS
    Netblock: 168.103.0.0 - 168.103.255.255
    Coordinator:
        Bechard, Keith    (KB46-ARIN)
keithb@ADVTECH.USWEST.COM
        (303) 541-6766
        Domain System inverse mapping provided by:

TABLE 1-continued

| NS1.INTERPRISE.NET | 204.147.80.6 |
|---|---|
| NS2.INTERPRISE.NET | 168.103.8.1 |
| NS3.INTERPRISE.NET | 207.224.192.1 |

Record last updated on 21 Aug. 2000.
Database last updated on 16 Aug. 2001 23:00:27 EDT.

As illustrated in Table 1, the assignee of the IP address is US West Communication Services, which acts as an ISP. The WHOIS search indicates that the location of the IP address 168.103.86.33 is at 600 Stinson Boulevard, Minneapolis, Minn. 55413, yet the actual location of the IP address, where it is actually connected to an end-device, is 515 S: Madison Avenue Suite 738 in Pasadena, Calif. The driving distance between the two locations is approximately 1991 miles, with an estimated travel time of 25.5 hours.

Thus, there is no current way to provide to end-users the exact and most up-to-date position information correlated to an IP address. Conventional systems use various techniques, such as the WHOIS database search, to associate position information with IP address. These methods, however, are very inaccurate and provide a large degree of position error. Other techniques include:

1. Running a WHOIS Database Search (example provide above).
2. Using a reverse DNS lookup to find out the host's name:
   a. As an example, given the IP address 132.74.18.2, a Domain Name Server (DNS) lookup translates the address to "construct.haifa.ac.il", which provides various hints, such as that the Top-Level Domain (TLD) is ".il", which implies that the host is in Israel. Additionally, the next two domains are haifa.ac, implying that the host belongs to the 'haifa' academia institute. The Haifa University happens to be in the city of Haifa, thus the IP address position information is in Haifa.
   b. Another example is, given the IP address 128.149.22.146, a DNS lookup translates the address to "b238-edge-g3-0-1.jpl.nasa.gov", which also provides various hints, such as that the TLD ".gov" represents that the host is at a government facility (i.e., in the US). Additionally, the "jpl.nasa" implies that the host belongs to Caltech's Jet Propulsion Laboratory, which belongs also to NASA. Looking up the location of the Jet Propulsion Laboratory (JPL) in a separate address database reveals that it has an address of 4800 Oak Grove Drive, Pasadena, Calif., 91109. Looking at the "b238-edge-g3-0-1" implies that the location of the IP address is in Building 238 at JPL. This naming convention, however, is esoteric and only staff or IT members at JPL would probably know what it illustrates.
3. Using a trace route program, since IP is based on a packet switched system, to determine approximate locations of routes between the two end-point IP addresses. The names of the routers through which packets flow from the origin host to the destination host might provide various hints of the geographical path (i.e. locations through which the packets flow), and of the final destination's physical location. For example, running a trace route program from Pasadena, Calif. to www.mit.edu yields the follow output:

1 * * * Request timed out.
2  40  ms  50  ms  40  ms brbndslgw1PoolA254.brbn.qwest.net [168.103.228.254]
3  40 ms  50 ms  40 ms  bur-edge-02.inet.qwest.net [205.171.13.153]
4  50 ms  51 ms  50 ms  svl-core-01.inet.qwest.net [205.171.5.219]
5  50 ms  50 ms  50 ms  sjo-core-01.inet.qwest.net [205.171.5.99]
6  60 ms  50 ms  50 ms  sfo-core-02.inet.qwest.net [205.171.5.123]
7  110 ms  120 ms  111 ms  jfk-core-01.inet.qwest.net [205.171.5.113]
8  110  ms  120  ms  111  ms  p3-3.nycmny1-cr8.bbnplanet.net [4.24.187.13]
9  120  ms  121  ms  120  ms  p6-0.bstnma1-br1.bbnplanet.net [4.24.6.49]
10  120  ms  121  ms  130  ms  p6-1.cambridge1-nbr2.bbnplanet.net [4.0.6.245]
11  120 ms  120 ms  130 ms  p10-0-0.mit2.bbnplanet.net [4.1.80.10]
12  120 ms  130 ms  130 ms  NW12-RTR-BACKBONE-.MIT.EDU [18.168.0.16]
13  130 ms  130 ms  120 ms  DANDELION-PATCH.MIT-.EDU [18.181.0.31]

Hence, it is possible to see all of the routers in between the two end points of Pasadena, Calif. and www.mit.edu using a trace route program, and by using the WHOIS database find their approximate locations.

4. Analyzing naming conventions of ISPs and Internet backbone connections.
   a. AT&T Dialups: <port>.<router-location>.<state>.dial-access.aft.net
   b. UU.net Dialups: <port>.<device>.<city>.<state>.<iu>.uu.net : <port>.<device>.<airport>.<iu>.uu.net Thus, it is possible using this method to determine the location of a router for various ISPs and backbone connections down to the City, State, or specific Airport location. For an actual location, i.e., an exact address, this naming convention proves insufficient.

In order to obtain an accurate mapping of IP address to geographical location using these current methods, there would have to be a WHOIS directory for every individual IP address. This is impossible since only large blocks (i.e., 4,096 or greater) of IP addresses are provided to site coordinators or system administrators of ISPs, typically. The other potential most accurate solution is provided by record extension to DNS described in RFC 1876. This extension allows system administrators the ability to update their DNS records with location information of varying resolution. Another attempt to express a host's geographical location via DNS records is done in RFC 1712. Both RFCs (i.e., 1712 and 1876) define a DNS Resource Record (RR) allowing the storage of IP-related geographical location information.

The problem exists in that most system administrators responsible for DNS records have tens of thousands of records they would have to update, thus proving that the association of position information to IP addresses is a difficult, if not impossible, undertaking for such an administrator or team of administrators. Most ISPs are responsible for more than 65,536 routable IP addresses. These IP addresses are used for both static and dynamic IP address assignments. From an ISP's perspective, it would be practically impossible to associate position information to every static IP address. Another drawback of the current DSN location record method is that a majority of users may not want to have their position information associated with their IP addresses for public viewing, as provided by current DSN records (i.e., RFC 1712 and 1875).

Wireless devices are well know in the art, and are used in both Local Area Network (LAN) and Wide Area Network (WAN) systems. Typical wireless device standards well known in the art include Bluetooth and WiFi (802.11b), among others. These wireless devices are typically connected through a gateway or bridge device that provides the wireless devices with Internet access. These wireless gateways or bridges have either static or dynamic routable or non-routable (e.g., 192.168.168.168) IP addresses. There is an immediate need for wireless devices with Internet access to be able to get their approximate position information based on the IP address of the gateway device through which they connect to the Internet, with the positional accuracy depending primarily on the range capability of the wireless gateway device.

Thus a need exits for a method and system that allows POI owners to instantaneously update or create their POI information, such as web address information, securely, quickly, and reliably. Additionally, a need exists for owners (such as renters of leasers) of IP addresses, such as a POI owner, to associate its IP address with the POI's position information. This would prove especially useful for network IP endpoints, in which only authorized users or clients can use and view their position information without the need for positioning devices, such as a Global Positioning Satellite (GPS) device. This provides a great advantage for wireless devices that have small coverage zones, since they would be able to obtain their approximate position information without the need for an expensive GPS add-on device, and in most cases, with about the same, or better, positional accuracy as a commercial GPS device can provide.

SUMMARY OF THE INVENTION

System and Method for Updating POI Information

It is an object of the present invention to provide a method and system for allowing a POI owner or authorized POI personnel, or the like, the ability to identify themselves by means of using a telephone or computing device with a unique identifier, such as an IP address. In one embodiment, a POI owner would call the POI updating system via a toll-free telephone number, such as an 800 number. The communication provider (e.g., the telephone company) would provide to the POI updating system at the very minimum the calling telephone number, and possibly the name or identity and address information associated with the telephone number.

It is another object of the present invention to provide a method and system for providing a unique password to a POI owner or authorized POI personnel, or the like, based on the caller's identified telephone number (or unique identifier), preferably after the telephone number (or unique identifier) has been correlated and verified with a known POI database. The password can be transmitted either through the same communication channel or via another communication channel, such as the Internet. The password can also be mailed using the postal system to the POI address to provide an additional measure of security. In one embodiment, after the caller (e.g., the POI owner) has been successfully identified by the aforementioned method, the system would provide the caller with a unique password over the telephone connection. In another embodiment, the caller would provide the system with their unique e-mail or Instant Messaging (IM) address information, in which the system would send the unique password (encrypted or non-encrypted) to the user's alternate destination address (i.e., e-mail or IM address) via the Internet.

It is another object of the present invention to provide a method and system for allowing POI owners or authorized POI personnel, or the like, to securely sign-in to a website using their provided password. In one embodiment, an additional security measure would require the user to use both their telephone number and password to sign-in to a website.

It is another object of the present invention to provide a method and system that allows POI owners or authorized POI personnel, or the like, using a provided password the ability to securely customize their POI records for each specific POI, such as updating or modifying web addresses (i.e., URLs) or other records (e.g., addresses, names, telephone numbers, etc.) that are associated with the specific POI. In one embodiment, a business owner of a restaurant POI wanting to add a URL to their POI listing so that customers performing a POI search on the Internet, for example, could click on their restaurant. In-vehicle navigational systems or typical mapping programs could then display the restaurant's URL associated with the other POI information, thus providing the user with immediate access to the restaurant's website address, without having to initiate a web search to find the restaurant's website. Additionally, a business POI owner wanting to provide users with POI specific business hours could also use this same process.

For instance, in an in-vehicle navigational system a search for the nearest gas station would return all of the gas stations within a given area, regardless of their operating hours. This method and system enables various POIs to be securely updated by their owners, thus allowing, for example, gas station POIs to post the hours that they are open for business. This enables the in-vehicle navigational systems to perform searches not only based on its location, but also incorporating the time of day information into the search for searching for only opened businesses, thus providing much better search results.

It is also another object of the present invention to provide a method and system for allowing such updated or modified POI information to be immediately incorporated into an accessible database for various applications and uses. In one embodiment, using a mobile, wireless, Internet-enabled navigational device to search for various POIs and utilizing the recently updated POI-specific information provides users the ability to obtain real-time POI-specific updates, such as being able to click on an updated URL that opens a web browser displaying, for example, a menu of a restaurant POI that could not otherwise be securely obtained.

System and Method for Updating IP Address Position Information

It is also an object of the present invention to provide a method and system for allowing a person, POI owner, or authorized POI personnel, or the like, the ability to identify themselves by means of a telephone call or connection via a computing device with a unique identifier, such as an IP address, where the communication provider provides the person's telephone number, identity, and address information to the identifying system. In one embodiment, a user would call a toll-free telephone number, such as an 800 number. The communication provider (e.g., the telephone company) would provide to the identifying system the calling person's number, identity, and address information.

It is another object of the present invention to provide a method and system for allowing a person, POI owner, or authorized POI personnel, or the like, the ability to identify themselves by means of using a telephone call or connection via a computing device with a unique identifier, such as an IP address, where the communication provider provides the person's telephone number and identity (e.g., person's name). In one embodiment, the system would then correlate the telephone number and/or identity information to a known database to establish the address information of the caller.

It is yet another object of the present invention to provide a method and system for allowing a person, POI owner, or authorized POI personnel, or the like, the ability to identify themselves by means of using a telephone or a computing device with a unique identifier, such as an IP address, where the communication provider provides the person's telephone number (e.g., (732) 555-7049), for example. In one embodiment, the identifying system would correlate the telephone number to a known database to establish the address information (e.g., 738 S. Madison Ave #2, Pasadena, Calif. 08805) of the caller.

It is yet another object of the present invention to provide a method and system for supplying a unique password to the caller of the identified telephone number or computing device with a unique identifier, for the purpose of defining and associating position information with both static routable or non-routable IP addresses. The password can be transmitted either through the same communication channel or via another communication channel, such as the Internet. The password can also be mailed using the postal system to the POI address to provide an additional measure of security. In one embodiment, after the caller has been successfully identified by the aforementioned method, the system would provide the caller with a unique password over the communication channel (e.g., open telephone connection). In another embodiment, the caller would provide the system with his or her unique e-mail or IM address information, which the system would use to send the unique password (encrypted or non-encrypted) to the user's alternate destination address (i.e., e-mail or IM address) via the Internet.

It is yet another object of the present invention to provide a method and system for allowing authorized users, to securely sign-in to a website using their provided password. In one embodiment, an additional security measure would be to require the user to enter his or her telephone number and/or IP address and password to sign-in to a website.

It is yet another object of the present invention to provide a method and system that allows authorized users with a provided password the ability to associate IP address information (e.g., 128.149.22.146) with position information (i.e., physical location) of varying resolution on a networked server for later retrieval.

It is yet another object of the present invention to provide a method and system that allows users that rent, lease, or are otherwise responsible for a specific static IP address (e.g., as is the case when using an ISP) the ability to securely identify themselves (i.e., with the use of their IP address) by means of a software or firmware program for the purpose of associating position information with their static IP address. In one embodiment, this position information can then be accessed at the device or immediately downstream from a particular given static IP address, such as wireless devices that are connected through a wireless gateway or bridge device that has associated with it the given static IP address.

The position information of varying resolution can then be obtained from a variety of networked clients either directly from the device with the IP address (e.g., a personal computer or 802.11b wireless gateway), or from an online-networked server that has the associated mapping of position-to-IP address information. Additionally, other devices located upstream to the given static IP address cannot request position information from either the online-networked server or the device itself, unless they have appropriate authority to access the position information. In one embodiment, a user with a web browser would access a website to download and then execute a program on the local computing device to securely determine the computer's routable IP address. If the computer's IP address were a non-routable IP address (i.e., 192.168.168.168), then the program would interrogate and identify the routable gateway (e.g., a Network Address Translation—NAT device) address (i.e., the subscriber's IP address), thus allowing the user to update the position information associated with that routable static IP address (i.e., the subscriber's IP address) on the online-networked server.

In another embodiment, a wireless gateway device has a firmware or software application running locally that allows users to locally update position information associated with the wireless gateway on the local device so that wireless users connected to the wireless gateway device can obtain their approximate position information of varying resolution, based on their distance from the wireless gateway device, directly and not requiring the online-networked server. The user could also utilize the online-networked server if necessary or appropriate using the previously described method.

It is yet another object of the present invention to provide a method and system that allows non-routable IP addresses (e.g., 192.168.168.168) that are associated with a static IP address (e.g., 128.149.22.146) acting as a gateway device, such as a Network Address Translation (NAT) device, to associate position information of varying resolution with the non-routable IP addresses that are related to the routable static IP address. Once defined, the position information of varying resolution can be obtained with the aid of a software or firmware application from a variety of clients either directly from the device with the IP address, or from a networked server that has the position and IP address information mapping.

It is yet another object of the present invention to provide a method and system that incorporates: 1). Telephone Identification with Password Method and System, and 2). Software/Firmware IP Address Identification Method and System, for the purpose of further securely identifying authorized users of IP addresses and associating position information of varying resolution (e.g., street, city, state, zip-code address information, and/or latitude and longitude location information, etc.) to those IP addresses.

It is yet another object of the present invention to provide a method and system for allowing coordinators of IP addresses, as defined in the authorized WHOIS database, the ability to securely identify themselves by means of a telephone number or e-mail address, also defined in the WHOIS database. By using a telephone number, the governing telephone organization responsible for the communication channel can verify or vouch for the user's identity by indicating that the number the user is calling from matches the telephone number listed in the WHOIS database. Additionally, using an e-mail address that is listed in a WHOIS database, a user would e-mail the system, for instance, and the system would reply to the user's e-mail address to confirm their identity. In one embodiment, the user would use a password, as provided in the e-mail body, to log on to the server system, or click on an embedded URL in the e-mail body, thus verifying that the user is an authorized user, as listed in the WHOIS database, for a given IP address or IP address block.

It is yet another object of the present invention to provide a method and system that allows identified and authenticated users (i.e., the coordinator), as provided in a WHOIS database, the ability to securely and immediately update position information of any of the user assigned IP addresses (such as a block of IP addresses), as illustrated in the WHOIS database.

It is yet another object of the present invention to provide a method and system that allows users that rent or lease, or are otherwise responsible for a given specific static IP address the ability to be identified by means of having the communication channel provider, which is providing the static IP address (e.g., ISP), verify or vouch for the identify of the user by various methods. In one embodiment, authorized users can be identified by their ISP-specific username and/or password, or their e-mail address or other specific identification associated with the IP address, which can be provided by the IP address provider (i.e., ISP), so that only authorized IP address users are allowed, to update or modify their IP address' position information on the online-networked server. In another embodiment, the system identifies the user by sending an e-mail to the user of the IP address, whose e-mail address and IP information is confirmed by the ISP, and once the user obtains a unique password, the user is able to update the position information for a particular set, or sets, of IP addresses that he or she manage or has control over, as identified by the ISP.

It is yet another object of the present invention to provide a method and system for providing position information to 'clients' that reside at or downstream from a defined IP address. This position information can be stored on a server residing on the Internet, Intranet, or Extranet, and can be accessed by clients to periodically request the position information of the closest defined IP addresses between the 'clients' and the networked server containing the association between the IP address and position information. In one embodiment, this provides clients connected to a wireless 802.11b or Bluetooth gateway the ability of obtaining their approximate position information of varying resolution securely and easily without the need for other position devices, such as a GPS device.

It is yet another object of the present invention to provide a method and system for preventing users, devices, or applications, other than those located downstream from the IP address with associated position information of varying resolution from obtaining such position information. In one embodiment, users (IP=128.149.22.146) downstream from a gateway device (IP=128.149.22.1) can obtain position information about the gateway device from the online-networked server containing the IP address-to-position mapping information. However, an outside device (IP=137.14.12.1) would not be able to obtain position information about the gateway device (IP=128.149.22.1) from the online-networked server due to the mismatch of IP address trellis network number 'locations' (i.e., 128.xxx.xxx.xxx versus 137.xxx.xxx.xxx).

BRIEF DESCRIPTION OF THE DRAWINGS

FIG. 1 illustrates a typical POI telephone book's fields and sample entry.

FIG. 7 illustrates various Standard Industrial Classification (SIC) and user-defined codes for various POI fields.

FIG. 8 illustrates a typical technique for updating various POI fields.

DETAILED DESCRIPTION OF THE PREFERRED EMBODIMENTS

The present invention provides a method and system for enabling a POI owner or authorized POI personnel the ability to securely, conveniently, and immediately update POI-specific information, such as defined by the Standard Industrial Classification (SIC) codes or additional forms specific to the POI defined by the authorized POI personnel or owner. In one embodiment, as illustrated in FIG. 1, a typical telephone book entry consists of the following 100 fields: 1). Name, 2). Street Address, 3). City, 4). State, 5). Zip Code, and 6). Telephone Number. An example of a typical telephone book entry is also provided 101 in FIG. 1.

Figure 2:
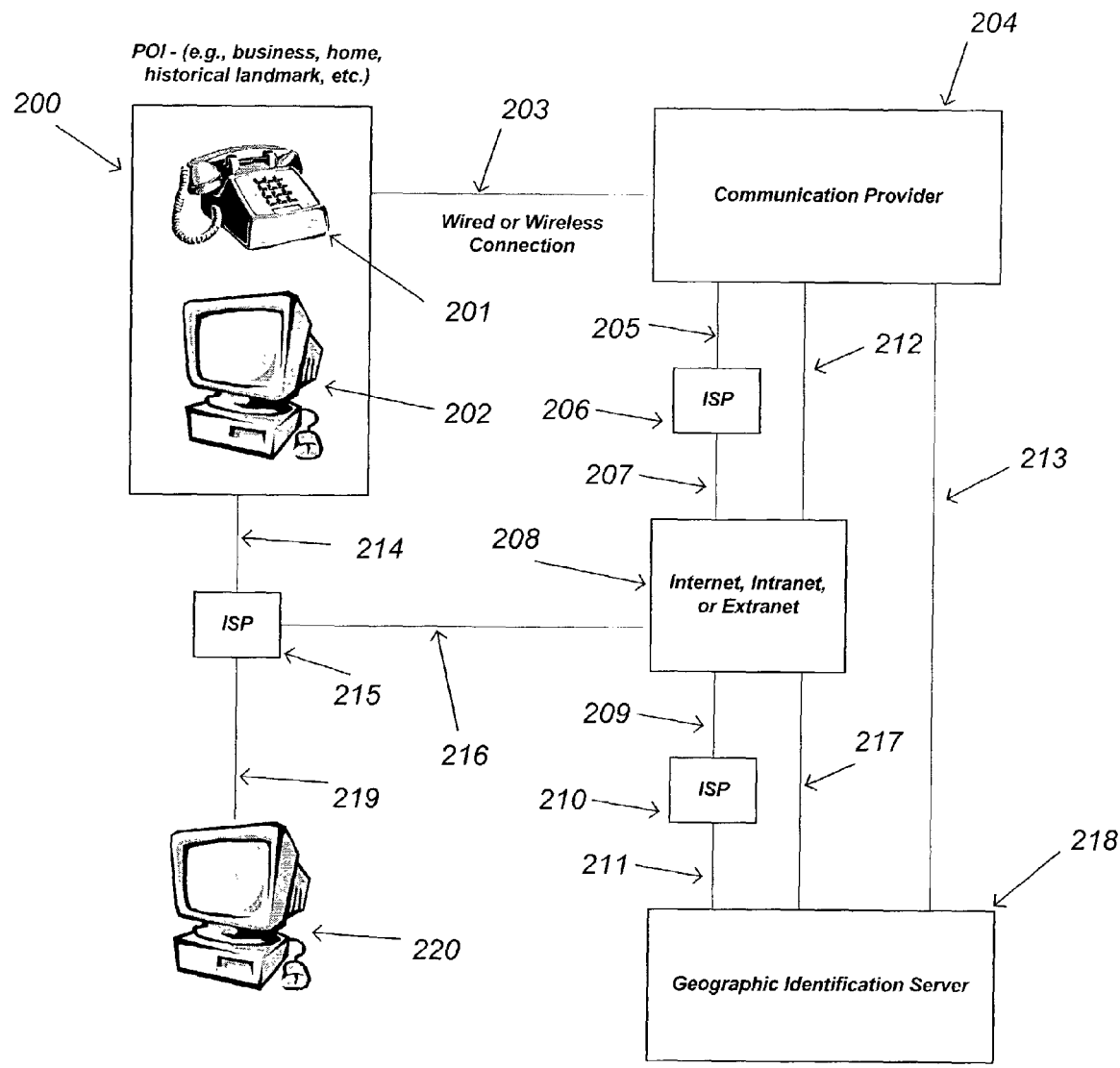
FIG. 2 illustrates a typical system for securely updating, creating, and modifying POI-specific information.

In one embodiment, a typical system for securely updating, creating, and modifying POI-specific information is shown is FIG. 2. A POI owner or authorized POI personnel 200 (i.e., a person that has access to the telephone associated with the POI) would initiate a telephone call to a pre-defined telephone number for the Geographic Identification Server 218, such as toll free number. The telephone call is preferably connected 203 through the POI's Communication Provider 204, such as being directly connected 203 to the telephone company's Central Office (CO) and then through a Public Switched Telephone Network (PSTN). The Communication Provider 204 can provide various connections to the Geographic Identification Server 218, such as: 1). A direct connection 213 to the Geographic Identification Server 218, 2). A direct connection 212 to the Internet, Intranet, or Extranet 208, and then a direct connection 217 to the Geographical Identification Server 218, 3). A direct connection 205 to an ISP 206 which has a direct connection 207 to the Internet, Intranet, or Extranet 208, which has a direct connection 209 to an ISP 210 which has a direct connection 211 to the Geographic Identification Server 218, or 4). Any other various combinations providing a data connection from the Communication Provider 204 to the Geographic Identification Server 218.

Figure 3:
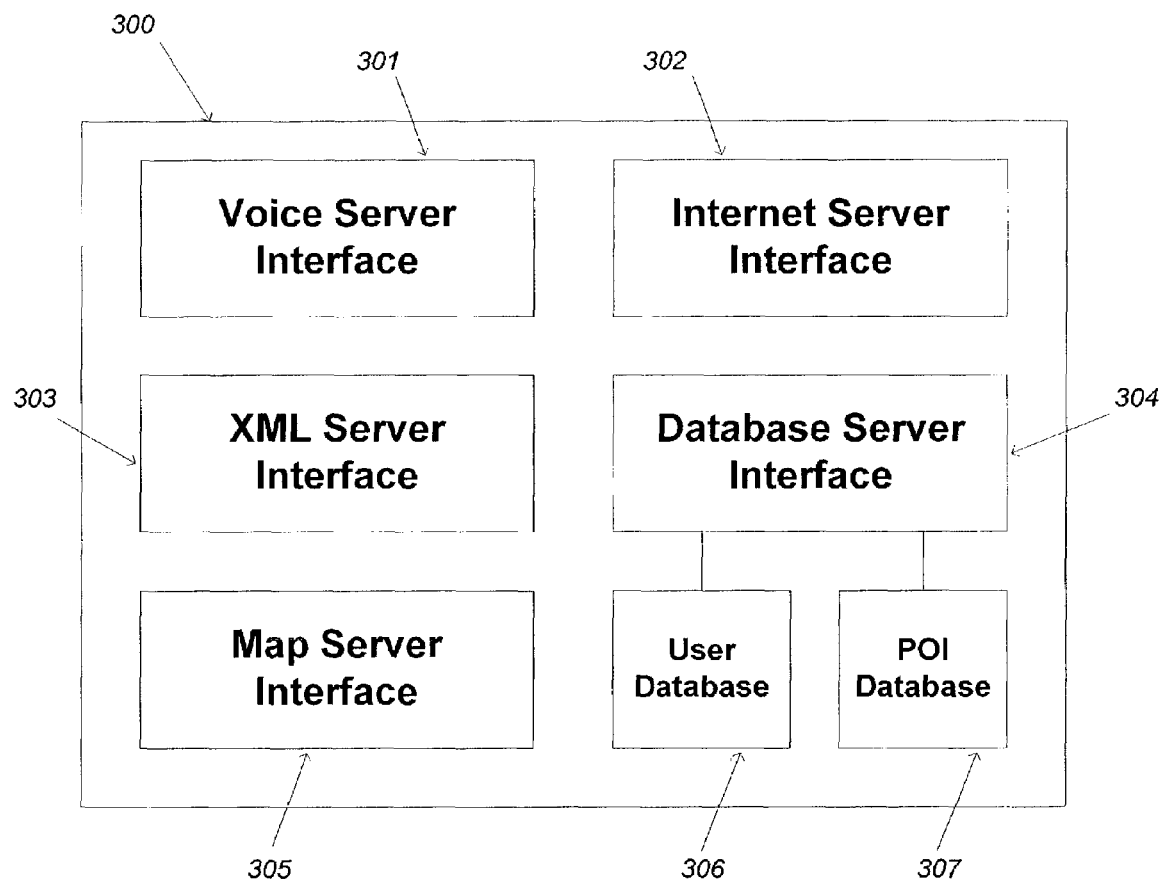
FIG. 3 illustrates the high-level component view of a typical embodiment of the Geographic Identification Server.

In one embodiment, the Geographic Identification Server 218 & 300 includes various components as illustrated in FIG. 3. Such components can include of the following: 1). Voice Server Interface 301 (i.e., providing a connection with a telephone carrier, such as with PSTN connection), 2). Internet Server Interface 302 (i.e., providing web page support and web browser interface capability), 3). XML Server Interface 303 (i.e., providing connectivity between various server components), 4). Database Server Interface 304 (i.e., providing access to the User Database 306 and the POI Database 307), 5). Map Server Interface 305 (i.e., providing the capability to show spatial maps of POIs, etc.), 6). User Database 306 (i.e., storing user-specific data), and 7). POI Database 307 (i.e., storing POI-specific data).

Figure 4:
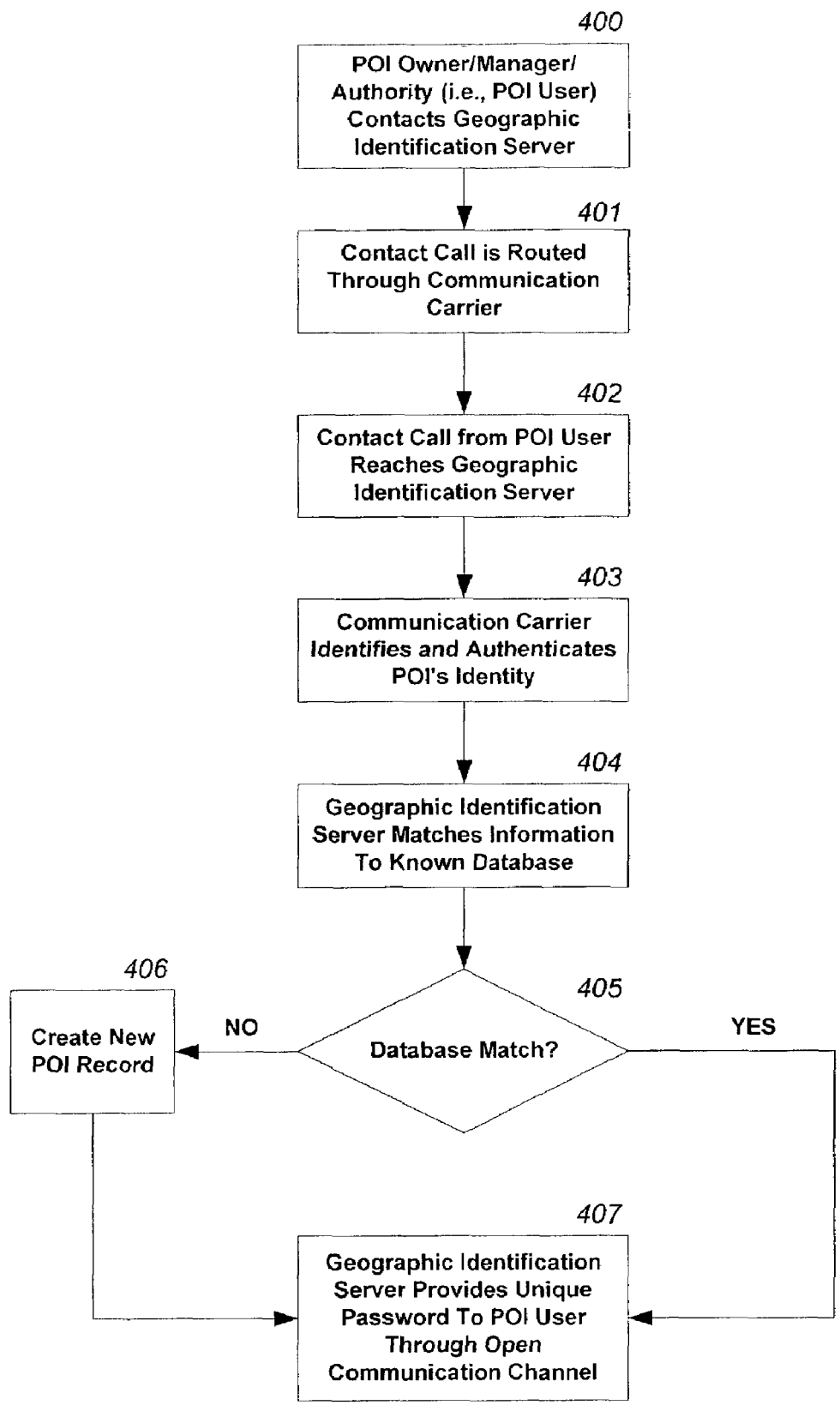
FIG. 4 illustrates a typical flowchart for securely identifying and. providing a password to a POI user.

FIG. 4 illustrates this process of providing a password to an authorized POI user. In one embodiment, a POI owner, manager, authority, or the like, contacts 400 the Geographical Identification Server 218. The call (i.e., a telephone call, Voice Over IP (VoIP) call, etc.) is routed 401 through the Communication Provider 204, until it reaches 402 the Geographical Identification Server 218, as shown using various connections as described above. The Communication Provider 204 identifies and authenticates the user's identity 403, such as by using caller ID, which is well know in the art. The Geographic Identification Server 218 uses the PO's telephone, obtained through the use of caller ID, and matches that number to a known database 307 to check 404 & 405 if that particular POI associated with the identified telephone number is currently stored in the present database. If the POI is stored in the database, the Geographic Identification Server 218 provides the POI user with a unique password for that particular POI through the same open communication channel 407. If the POI is not currently stored in the present database 307, then the Geographic Identification Server 218 creates 406 a new POI record associated with the telephone number in which the fields associated with this newly created POI will not be populated until the authorized POI user updates them. After the new POI record is created, the Geographic Identification Server 218 provides the POI user a unique password for that particular POI through the same open communication channel 407. Additionally, the password can be transmitted either through the same communication channel or via another communication channel, such as the Internet. The password can also be mailed using the postal system to the POI address to provide an additional measure of security.

Figure 5:
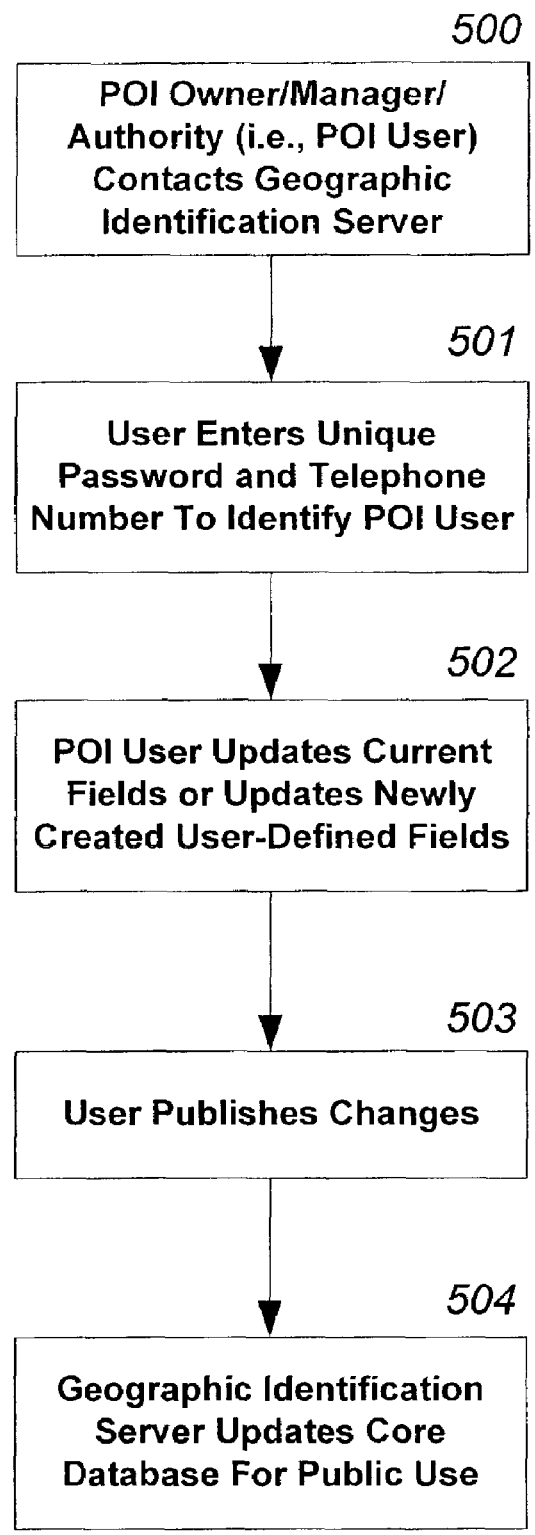
FIG. 5 illustrates a typical flowchart for securely signing-in to a website and updating POI-specific information.

Once the authorized POI user has obtained the password, as shown in the previously described methods, for instance, the POI user may use the password, with or without additional POI information, such as a telephone number, to update or create specific POI fields. In one embodiment, as shown in FIG. 2 and FIG. 5, a user contacts the Geographic Identification Server 500 by utilizing a computing device 202 or 220, such as a personal computer. For example, a user located at the particular POI, or at another location, would use a computing device 202 or 220 to connect 214 or 219 to a communication provider, such as an ISP 215 which is connected 216 to the Internet, Intranet, or Extranet 208, for the purpose of obtaining Internet access. The Geographical identification Server 218 also has a direct Internet connection 217, or has an indirect connection 211 to the Internet through an ISP 210, which has a connection 209 to the Internet 208. With this connection established, the authorized POI user can load, for example, a program or web browser, such as a Netscape or Microsoft IE browser, for the purpose of providing a direct data connection to the Geographic Identification Server 218.

Figure 6:
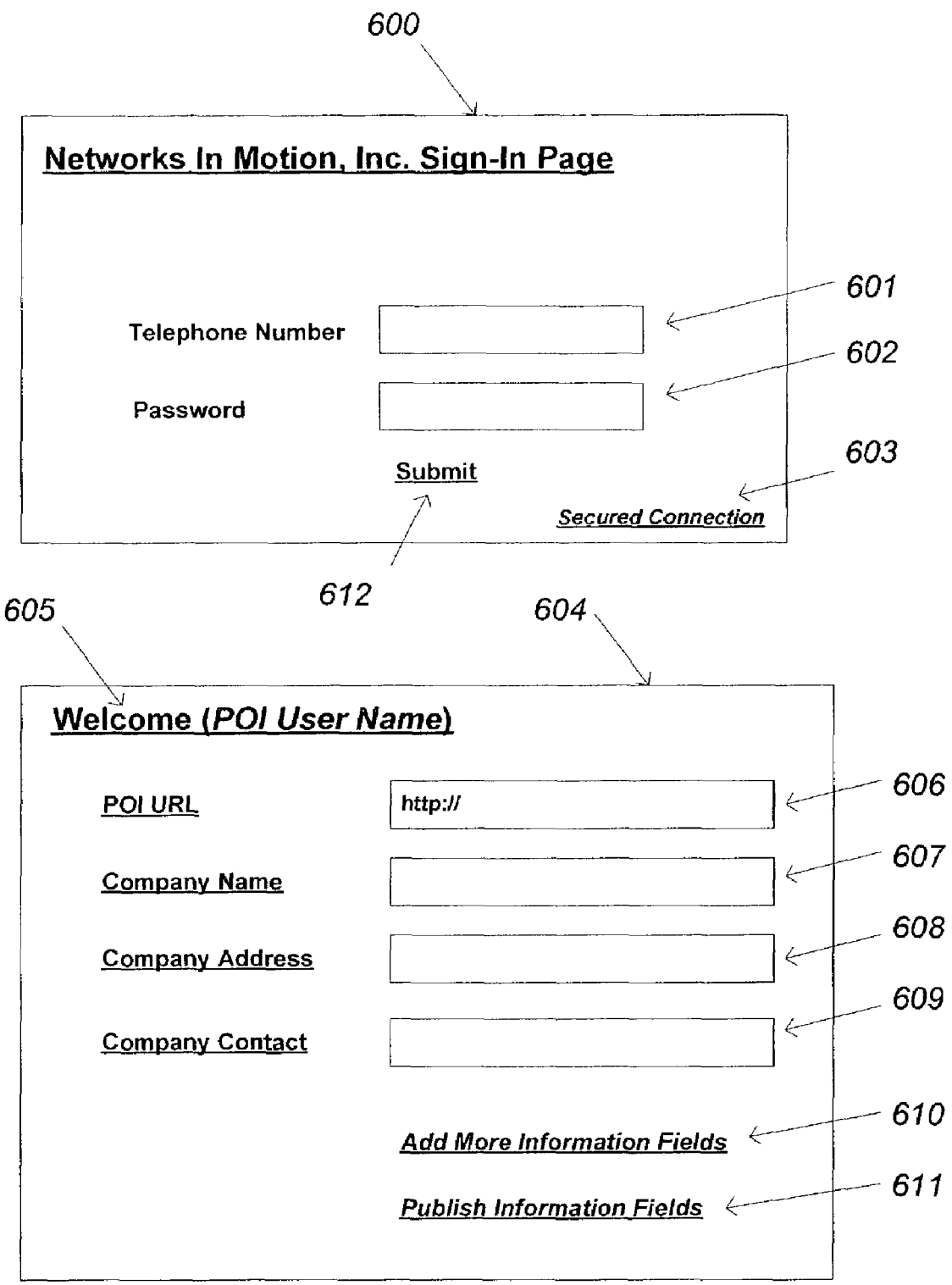
FIG. 6 illustrates a typical sign-in page for securely updating, modifying, or creating POI field information.

Using a web browser a sign-in page loads 600, as shown in FIG. 6, that employs a secure SSL connection 603. The authorized POI user enters 501 the POI's unique password 602 and telephone number 601 in the appropriate fields in the web page 600. After submitting 612 the appropriate information (i.e., telephone number and password), a new web page loads 604 that illustrates the POI user name 605 and current POI specific fields, such as the POI URL 606, company name 607, company street address 608, and the company contact 609. In one embodiment, other fields exist, such as the capability to add more POI information fields 610. Once any POI field modifications 502 have been completed, the user can update the POI fields by publishing 503 them 611, in which they will become immediately available 504 for other users to view and utilize for various applications.

The SIC codes provide various POI specific fields, such as contact name, address, city, state, 5 digit zip code, 4 digit zip code extension, etc., plus other fields can be incorporated, such as company URL address, business hours, etc. A subset of the entire SIC code fields amongst other fields is shown in FIG. 7.

For the purpose of modifying, changing, or creating POI specific fields, such as a URL address or company name change, a method is provided as shown in FIG. 8. In one embodiment, as shown in FIG. 8A, once an authorized POI user has securely signed-in, they may update any POI field by clicking on the field they wish to change. Using an icon pointer 800, such as with using a mouse, an authorized POI user would click on the field they wish to change. A new window would appear 801 that would provide all of the available information categories. To scroll through all of the available information categories, scroll bars have been provided at the top and bottom 803 of the new window. Also, the window allows a user to create their own POI specific field 802, such as a field for business operating hours. A POI-specific field can be chosen, as shown in FIG. 8B, by highlighting the appropriate field 804 with the icon pointer 805, and then clicking on that field. The newly created field will appear in the original window 604 for which the authorized POI user can associate specific POI information with.

This invention provides the ability, using slightly the same method and process as described above, for the purpose of mapping or associating position information of varying resolution to IP addresses. Utilizing the same process for determining a caller's identity, as illustrated in FIG. 2 and FIG. 4, the system would then obtain as much information about the caller as possible. In one embodiment, a caller ID system would only provide a telephone number. This information would be used in conjunction with other identification methods, such as using a reverse phone number lookup to further identify the user.

Figure 9:
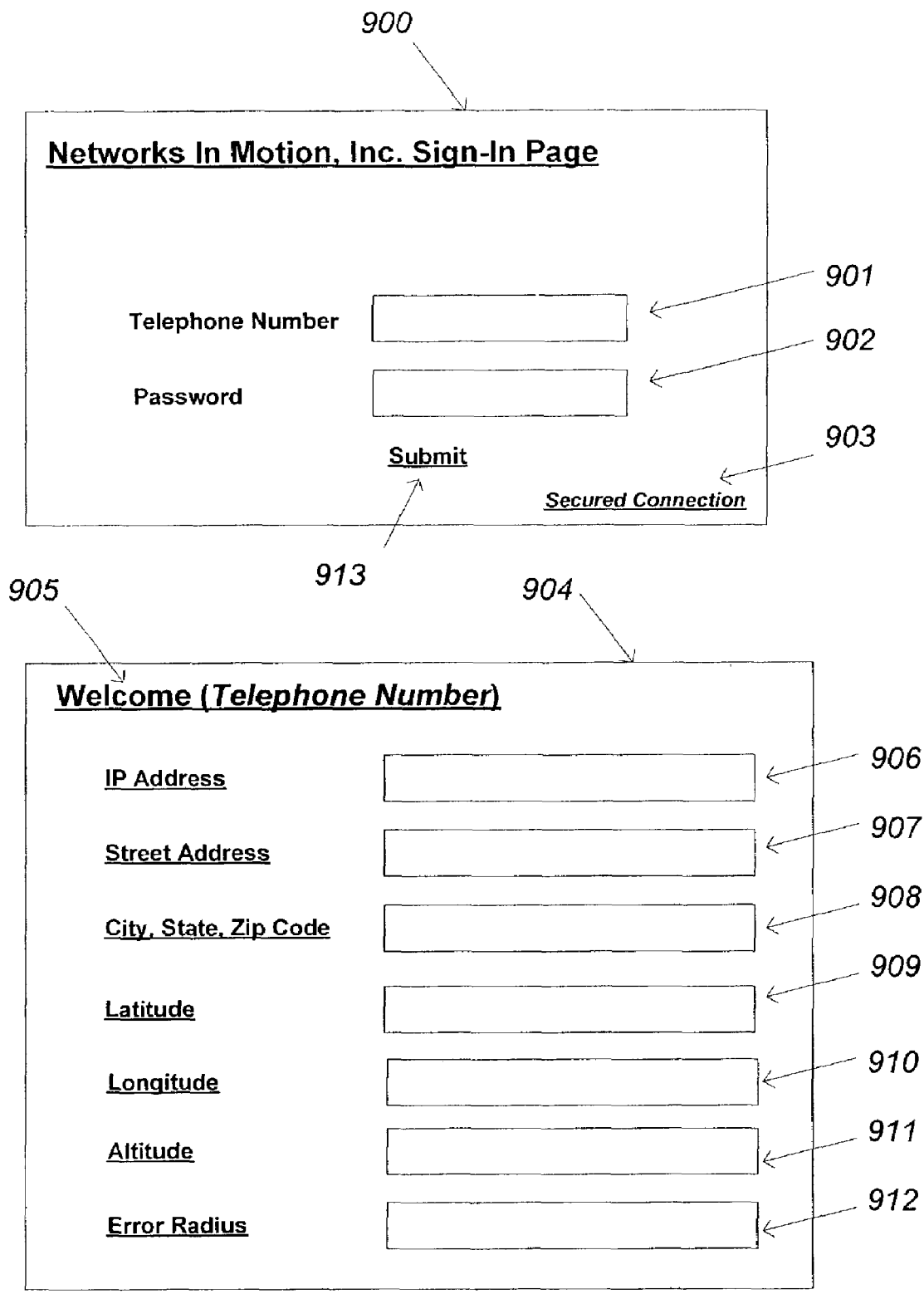
FIG. 9 illustrates a typical sign-in page for securely updating, modifying, or creating IP address to position information associations.

Once a telephone number has been assigned to a particular user, certain recourse can be taken if they provide false information, such as an IP address with another person's address information. If the system is able to calculate a reverse phone number lookup, then it is possible to determine the approximate location of the telephone number. If no address information is possible, the area code will provide some level of position information to use in validating any position information entered. As shown in FIG. 9, after a user has obtained a password associated from a telephone number using the previously described method, the user would utilize a computer with an Internet connection and a web browser to enter and submit 913 a telephone number 901 and password 902 on a specific secure 903 web page 900. Submitting the correct information would lead to a new web page 904 welcoming the user 905. The user would then be able to enter the IP address 906, street address 907, city, state, and zip code information 908, latitude 909, longitude 910, altitude 911, and error radius information 912. Any of this information can be omitted, and the error radius information provides the user with the potential error in position information, such as when using a wireless gateway or an inaccurate GPS device.

Figure 10:
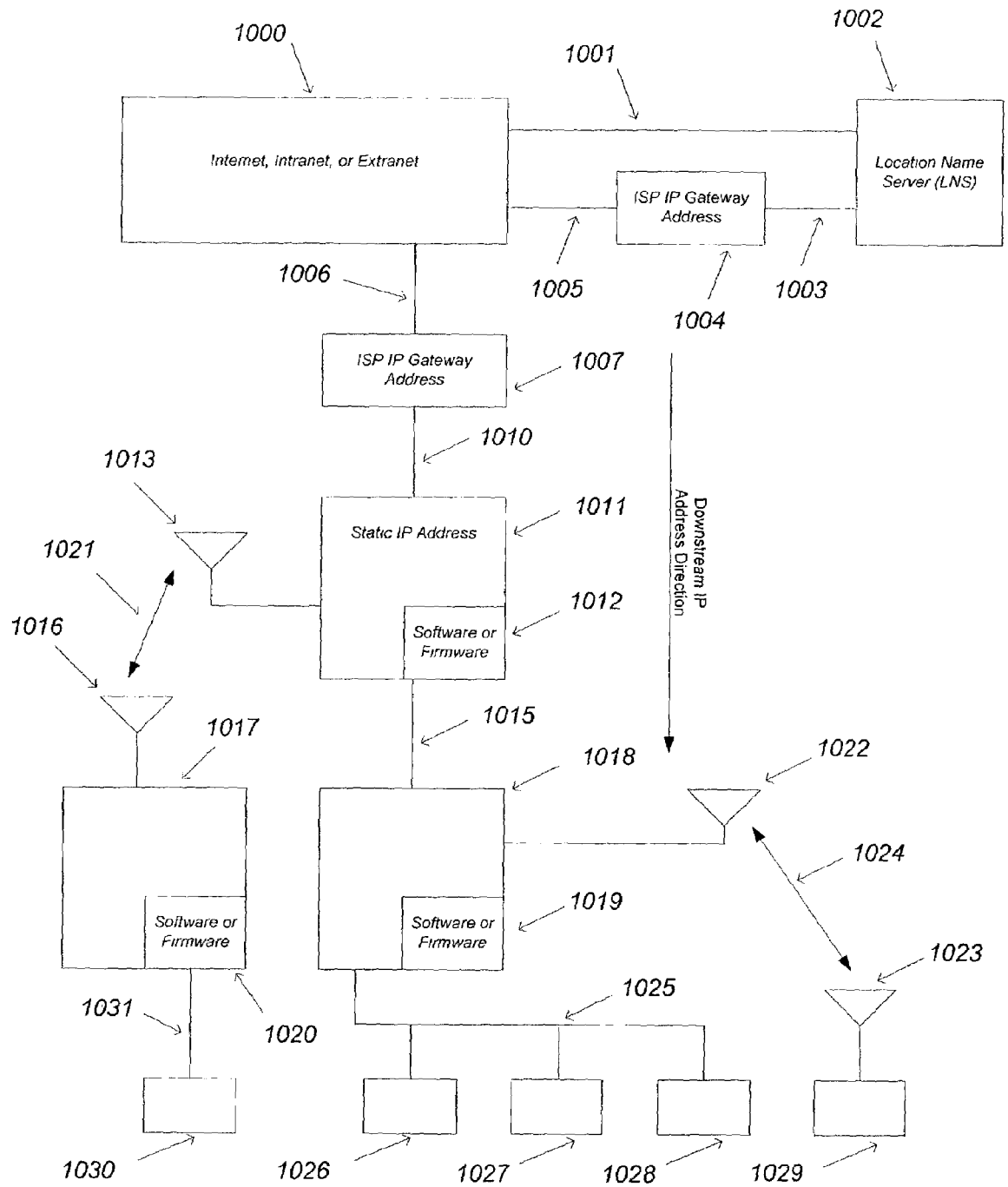
FIG. 10 illustrates a block diagram of various client and Location Name Server (LNS) configurations.

In one embodiment, another method of verifying a user actually has control over a static IP address is by installing and running a program on the local client device. As illustrated in FIG. 10, a client with a static IP address 1011 executes a software or firmware 1012 application that communicates directly with the client to securely determine the IP address 1011 of the client. The client then preferably communicates this information with the online networked server, also called the Location Name Server (LNS) 1002. This data communication can occur through a connection 1010 to the client's ISP gateway 1007, which has a direct connection 1006 to the Internet, Intranet, or Extranet 1000. The LNS 1002 has either a direct connection 1001 to the Internet, Intranet, or Extranet 1000, or is connected 1003 to an ISP 1004, which has a connection 1005 to the Internet, Intranet, or Extranet 1000. The client 1011 communicates the IP information with the LNS 1002, which then provides the user with a password, and allows the client 1011 to associate position information with the client's IP address on the LNS 1002 as illustrated in FIG. 9 in the second window 904.

Once the position information is stored on the LNS 1002 for the client 1011, it is now possible for the client 1011 to securely access its position information directly from the LNS 1002, or from the software or firmware 1012 application running on the client 1011. Additionally, other clients downstream 1017 & 1018 can access the position information of the primary client 1011 with the position-to-IP address information association from the LNS 1002. This is possible since the path between a downstream client 1017 or 1018 and the LNS 1002 crosses the primary client 1011, whose position-to-IP address information association is stored on the LNS 1002, and since the primary client 1011 is an end-node device and that the other clients are downstream from the primary client 1011.

Figure 11:
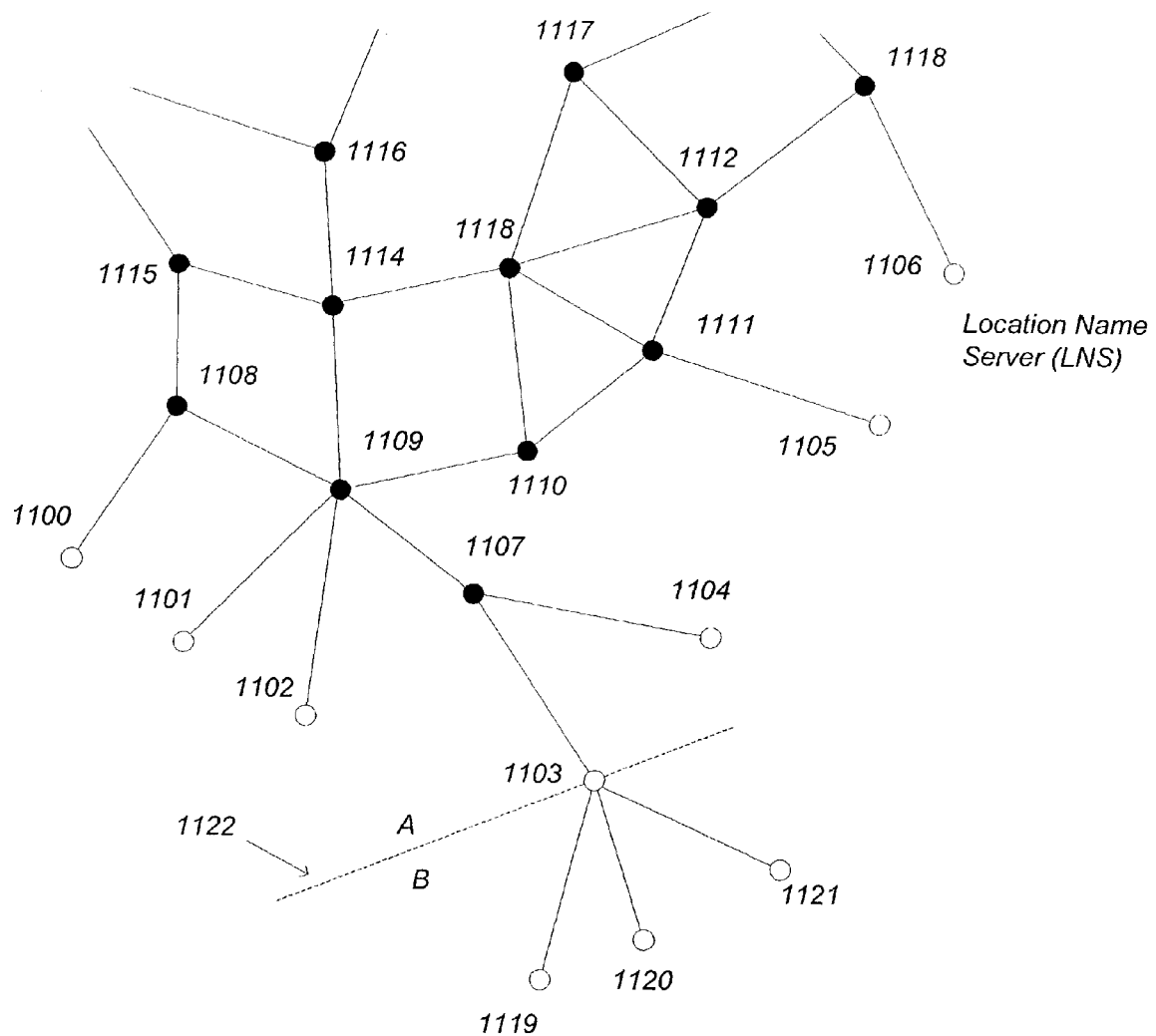
FIG. 11 illustrates a typical network topology emphasizing the network end-nodes or IP addresses.

For instance, FIG. 11 illustrates nodes, which represent as a subset of the Internet 1000 (from FIG. 10), and end-nodes (i.e., 1011, 1002, 1100, 1101, 1102, 1103, 1104, 1105, 1106). An end-node device is a device that is not a router, i.e., a device that only has one connection to the routable Internet (i.e., including NAT devices). For example, the node 1107 in FIG. 11 has 3 connections to 1109, 1103, and 1104, and is thus acting as a gateway, bridge, or router. Since the 2 nodes, 1103 and 1104, only have one routable Internet connection, they are defined as Internet end-node devices. The line 1122 illustrates an A-side and B-side, where the A-side has routable Internet IP addresses, and the B-side has non-routable IP addresses (e.g., 192.168.168.168). The device 1103 is typically referred to as a Network Address Translation, or NAT, device, since it has various non-routable IP address devices 1119 & 1120 & 1121 downstream from it, and because it can translate one routable IP address into multiple non-routable IP addresses.

A downstream path occurs when a packet connection is established, such as between two end-node devices 1103 & 1106, where the packet's route is in the downstream direction toward any end-node device (e.g., 1103 and 1106). So the downstream direction for the 1106 device is moving from the 1103 device towards the 1106 device, while the downstream direction for the 1103 device is moving from the 1106 device towards the 1103 device. Also, the downstream path can change between the two devices 1103 and 1106. For instance, the first time the 1106 device's sends a packet to the 1103 device, the packet's path could include travel through device 1110, and the next time the 1106 device sends a packet to the 1103 device, the packet's path could then travel through device 1114 instead of device 1110. However, since devices 1103 and 1106 are end-node devices and have only one routable Internet connection, packets between devices 1103 and 1106 must always pass through the devices 1107 & 1118, since they are acting as gateway devices.

For security purposes, in one embodiment, the device 1103 is preferably allowed to request its position information from the LNS device 1106. However, device 1100 could not request the position information for device 1103 from the LNS device 1106, since it is not downstream from 1103 relative to the LNS 1106. Similarly, the device 1107 could not request the position information of 1103. However, the device 1103 can request position information of device 1107 from the LNS 1106 since it is downstream from it.

As illustrated in FIG. 10, the primary client 1011 can have multiple devices (i.e., non-routable IP addressed devices) (e.g., 1017 & 1018) below it, since the primary client 1011 is acting as a wired 1015 or wireless 1021 & 1024 (1013, 1016, 1022, & 1023 represent wireless antennas) NAT device or bridge. All downstream devices, such as devices 1017 & 1018 & 1026 & 1027 & 1028 & 1029 & 1030, are represented to the outside Internet network by the primary client device 1011. The downstream devices 1017 & 1018 & 1026 & 1027 & 1028 & 1029 & 1030 can request position information about the primary client's position 1011 from the LNS 1002 or from the primary client device 1011 running the software or firmware 1012 application.

Figure 12:
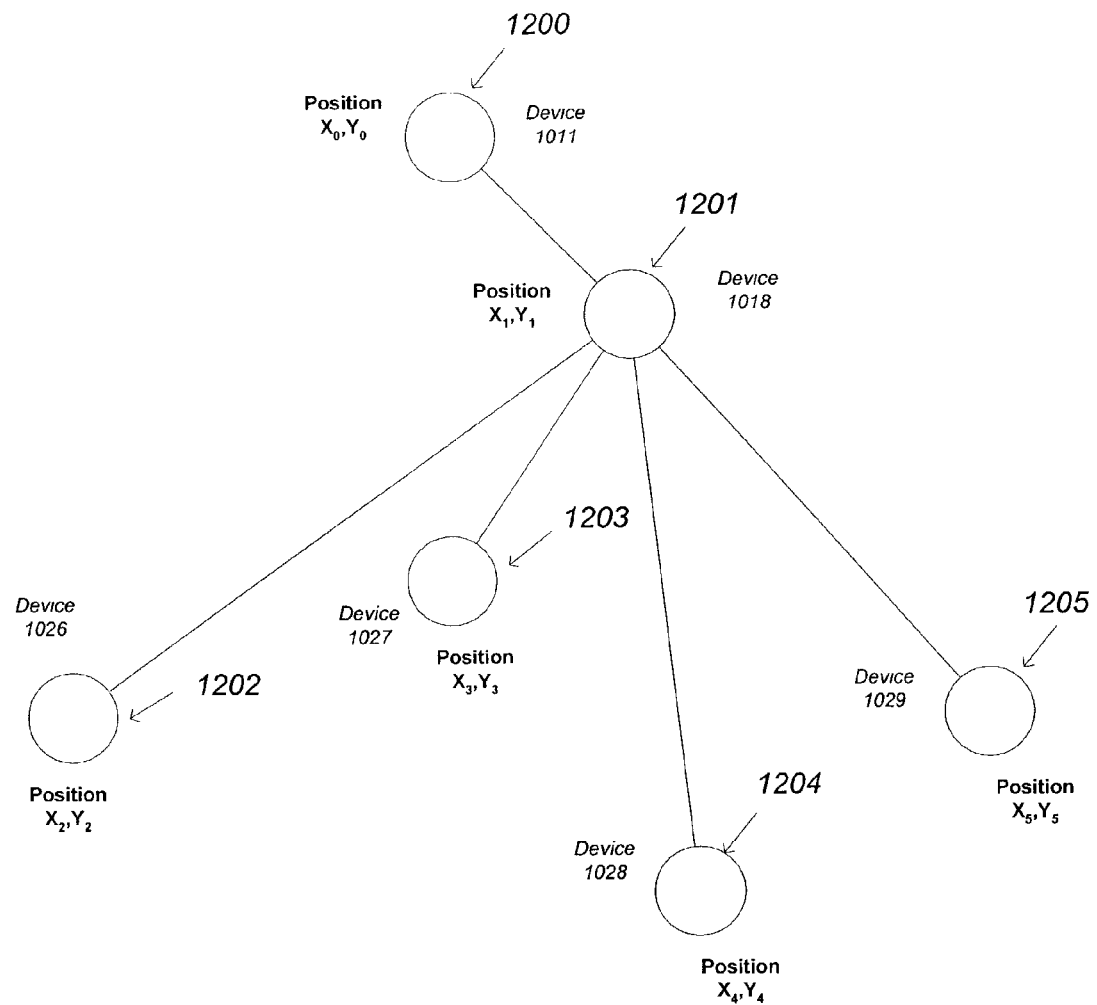
FIG. 12 illustrates a typical diagram for assigning position information to non-routable IP addresses.

In another embodiment, non-routable IP address clients, such as 1026, 1027, 1028, and 1029 of FIG. 10 can obtain their location information even though they have non-routable Internet IP addresses (e.g., 192.168.168.168). In one embodiment, a software or firmware 1012 application can run on the primary IP address client 1011. This software or firmware 1012 application provides position information about the non-routable IP address clients, 1026, 1027, 1028, & 1029. For example, as illustrated in FIG. 12, the position 1200 of device 1011 is known by use of the previously explained methods.

When one of the non-routable IP address clients (e.g., 1201, 1202, 1203, 1204, or 1205) requests its position information, the LNS 1002 returns the position information of the primary client device 1011, and the primary client has stored the relative or true positions of the other clients (e.g., 1201, 1202, 1203, 1204, 1205) and provides the correct information to the destination client. Additionally, the primary client or other upstream client (i.e., 1018 or 1017) runs a software or firmware application 1019 or 1020 that can provide its position information, or the position information of the other downstream clients (i.e., 1026, 1027, 1028, 1029, 1030) or their position information relative to the primary client 1011 obtained from the LNS 1002 through their various connections (i.e., wired or wireless connections 1025, 1024, 1031). The exact position of the other downstream clients can only be provided if they are not wireless (such is not the case with client 1029).

The WHOIS approach method, as illustrated in FIG. 2 and FIG. 4 and previously described for identifying a telephone identity, can also be applied to a WHOIS database search for identifying a user. Also, since the WHOIS database provides e-mail address information, the networked server can send e-mail to the user with password information, which is similar to the telephone identification method.

Using this approach, an ISP can identify a block of IP addresses for position information. The ISP would provide some form of identification, such as an e-mail address, and the user's IP address information to the LNS 1002, 1106. Should the user want to update the position information associated with his or her IP address, the LNS 1002 & 1006 would verify the user's identity and authority by sending to the user an e-mail with a password to sign-in (as previously described). The verified user would then be allowed to update the position information for the IP addresses that they are responsible for, according to the ISP.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A method for maintaining a publicly searchable database of points of interest, said method comprising the steps of:
    establishing a telephone call with a user, said telephone call being established through a telephone communication network;
    identifying a telephone number associated with the telephone call;
    matching a physical address with the identified telephone number;
    matching a point of interest with the physical address;
    assigning a unique password to the point of interest;
    providing to the user the assigned unique password;
    establishing communication with the user via an Internet connection, wherein the user initiates the communication by login on a designated website by providing the telephone number and the assigned unique password;
    receiving from the user, over the Internet connection, the assigned unique password; authenticating the user login by verifying the unique password provided is assigned to the telephone number provided;
    receiving from the user, via the Internet connection, business information associated with the point of interest, said business information including at least one of a name of a business establishment, a physical address of the business establishment, the business operating hours of the business establishment, and an URL of the business establishment;
    accessing the database containing a directory of points of interest;
    determining whether the database includes pre-stored record information associated with the point of interest;
    if it is determined that the database includes pre-stored record information associated with the point of interest, retrieving, from the database, the pre-stored record information associated with the point of interest and updating the pre-stored information by editing the information with the business information received from the user; and
    if it is determined that the database does not include pre-stored information associated with the point of interest, adding the business information received from the user to the database to thereby create a new record information associated with the point of interest.

2. The method of claim 1, wherein the assigned unique password is provided to the user by postal mail.

3. The method of claim 1, wherein the Internet communication is established using an encryption protocol.

4. The method of claim 1, wherein the telephone call is established using a geographic identification server, wherein said geographic identification server includes a map server interface for accessing mapping information.

5. The method of claim 1, further comprising the step of providing the updated databse on the Internet.

6. The method of claim 1, further comprising the step of, in response to a consumer request via the Internet to view information about a point of interest, displaying the stored record information associated with the point of interest.

7. The method of claim 1, further comprising the step of displaying additional information associated with the requested point of interest, said additional information including mapping information of the point of interest.

8. A machine-readable medium containing a set of executable instructions for causing a processor to perform a method for maintaining a publicly searchable database of points of interest, said method comprising the steps of: establishing a telephone call with a user, said telephone call being established through a telephone communication network;
  identifying a telephone number associated with the telephone call;
  matching a physical address with the identified telephone number;
  matching a point of interest with the physical address;
  assigning a unique password to the point of interest;
  providing to the user the assigned unique password;
  establishing communication with the user via an Internet connection, wherein the user initiates the communication by login on a designated website by providing the telephone number and the assigned unique password;
  receiving from the user, over the Internet connection, the assigned unique password; authenticating the user login by verifying the unique password provided is assigned to the telephone number provided;
  receiving from the user, via the Internet connection, business information associated with the point of interest, said business information including at least one of a name of a business establishment, a physical address of the business establishment, the business operating hours of the business establishment, and an URL of the business establishment;
  accessing the database containing a directory of points of interest;
  determining whether the database includes pre-stored record information associated with the point of interest;
  if it is determined that the database includes pre-stored record information associated with the point of interest, retrieving, from the database, the pre-stored record information associated with the point of interest and updating the pre-stored information by editing the information with the business information received from the user; and interest; and
  if it is determined that the database does not include pre-stored information associated with the point of interest, adding the business information received from the user to the database to thereby create a new record information associated with the point of interest.

9. The method of claim 8, wherein the assigned unique password is provided to the user by postal mail.

10. The method of claim 8, wherein the Internet communication is established using an encryption protocol.

11. The method of claim 8, wherein the telephone call is established using a geographic identification server, wherein said geographic identification server includes a map seryer interface for accessing mapping information.

12. The method of claim 8, said method further comprising the step of providing the database on the Internet.

13. The medium of claim 8, said method further comprising the step of, in response to a consumer request via the Internet to view information about the point of interest, displaying the stored record information associated with the point of interest.

14. The method of claim 8, said method further comprising the step of displaying additional information associated with the point of interest, said additional information including mapping information of the point of interest.

15. The method of claim 2 pr method of claim of claim 9 wherein the unique password is mailed to the user at an address to which the telephone number is registered.

16. The method of claim 1 or method of claim 8 wherein said step of establishing a telephone call is performed before said step of matching a physical address with the identified telephone number.

17. The method of claim 1 or method of claim 8, wherein said step of establishing a telephone call is performed before said step of identifying a telephone number associated with the telephone call.

18. A system for maintaining a publicly searchable directory of points of interest, said system comprising:
  means for establishing a telephone call with a user, said telephone call being established through a telephone communication network;
  means for identifying a telephone number associated with the telephone call;
  means for matching a physical address with the identified telephone number;
  means for matching a point of interest with the physical address;
  means for assigning a unique password to the point of interest;
  means for providing to the user the assigned unique password;
  means for establishing communication with the user via an Internet connection, wherein the user initiates the communication by login on a designated website by providing the telephone number and the assigned unique password;
  means for receiving from the user, over the Internet connection, the assigned unique password;
  means for receiving from the user, via the Internet connection, business information associated with the point of interest, said business information including at least one of a name of a business establishment, a physical address of the business establishment, the business operating hours of the business establishment, and an URL of the business establishment;
  means for accessing a database containing the directory of points of interest;
  means for determining whether the database includes pre-stored record information associated with the point of interest:
  means for, if it is determined that the database includes pre-stored record information associated with the point of interest, retrieving, from the database, the pre-stored record information associated with the point of interest and updating the pre-stored information by editing the information with the business information received from the user: and
  means for, if it is determined that the database does not include pre-stored information associated with the point of interest, adding the business information received from the user to the database to thereby create a new record information associated with the point of interest.

19. The system of claim 18, wherein the communication is established using an encryption protocol.

20. The system of claim 18, wherein the means for establishing a telephone call is a geographic identification server, wherein said geographic identification server includes a map server interface for accessing mapping information.

21. The system of claim 18, further comprising means for providing the directory on the Internet.

22. The system of claim 18, further comprising means for, in response to a consumer request via the Internet to view information about a point of interest, displaying the stored record information associated with the point of interest.

23. The system of claim 18, further comprising means for displaying additional information associated with the point of interest, said additional information including mapping information of the point of interest.

* * * * *